(12) United States Patent
Zhang et al.

(10) Patent No.: US 11,981,979 B2
(45) Date of Patent: May 14, 2024

(54) DEVICE AND METHOD FOR PREPARING LOW-IMPURITY REGENERATED BRASS ALLOY THROUGH STEP-BY-STEP INSERTION OF ELECTRODE

(71) Applicant: UNIVERSITY OF SCIENCE AND TECHNOLOGY BEIJING, Beijing (CN)

(72) Inventors: Xinfang Zhang, Beijing (CN); Baoyu Zhang, Beijing (CN); Xiaoshan Huang, Beijing (CN); Mengcheng Zhou, Beijing (CN); Changhao Liu, Beijing (CN); Di Zhang, Beijing (CN); Longge Yan, Beijing (CN)

(73) Assignee: UNIVERSITY OF SCIENCE AND TECHNOLOGY BEIJING, Beijing (CN)

( * ) Notice: Subject to any disclaimer, the term of this patent is extended or adjusted under 35 U.S.C. 154(b) by 0 days.

(21) Appl. No.: 18/379,213

(22) Filed: Oct. 12, 2023

(65) Prior Publication Data

US 2024/0043964 A1    Feb. 8, 2024

Related U.S. Application Data

(63) Continuation of application No. PCT/CN2023/093154, filed on May 10, 2023.

(30) Foreign Application Priority Data

May 10, 2022    (CN) .......................... 202210532192.5

(51) Int. Cl.
C22C 1/02    (2006.01)
C25C 3/34    (2006.01)

(52) U.S. Cl.
CPC . *C22C 1/02* (2013.01); *C25C 3/34* (2013.01)

(58) Field of Classification Search
CPC .................................... C22C 1/02; C25C 3/34
See application file for complete search history.

(56) References Cited

FOREIGN PATENT DOCUMENTS

CN    85104161 A    3/1987
CN    108326266 A    7/2018
(Continued)

OTHER PUBLICATIONS

CN-111549237-B, Qin. Machine translation. (Year: 2021).*
CN-109911902-A, Chang. Machine translation. (Year: 2019).*
CN-113718121-A, Feng. Machine translation. (Year: 2021).*

*Primary Examiner* — John A Hevey
(74) *Attorney, Agent, or Firm* — Bayramoglu Law Offices LLC

(57) ABSTRACT

A device and method for preparing a low-impurity regenerated brass alloy through step-by-step insertion of an electrode are provided. The device includes a melt heating apparatus, an electrode displacement apparatus, and a pulse current generation apparatus. The automatic electrode lifting apparatus is controlled to adjust an insertion depth of the graphite electrode plate in the metal melt, and the pulse current generation apparatus is controlled to adjust the parameters of pulse current to achieve the impurity reduction on the metal melt. The preparation of a low-impurity regenerated brass alloy involves a short production process, simple operations, low energy consumption, and high impurity removal efficiency, and is suitable for regeneration and large-scale continuous production of non-ferrous metal alloys.

5 Claims, 2 Drawing Sheets

(56) References Cited

FOREIGN PATENT DOCUMENTS

| | | | | |
|---|---|---|---|---|
| CN | 109911902 A | * | 6/2019 | |
| CN | 111549237 B | * | 8/2021 | ............ C22B 21/06 |
| CN | 113718121 A | * | 11/2021 | |
| CN | 113753900 A | | 12/2021 | |
| CN | 113755891 A | | 12/2021 | |
| CN | 113755892 A | | 12/2021 | |
| CN | 114959327 A | | 8/2022 | |
| DE | 102012001907 A1 | | 8/2013 | |
| GB | 2264353 A | | 8/1993 | |
| JP | 2008123724 A | | 5/2008 | |

\* cited by examiner

DEVICE AND METHOD FOR PREPARING LOW-IMPURITY REGENERATED BRASS ALLOY THROUGH STEP-BY-STEP INSERTION OF ELECTRODE

CROSS REFERENCE TO THE RELATED APPLICATIONS

This application is a continuation application of International Application No. PCT/CN2023/093154, filed on May 10, 2023, the entire contents of which are incorporated herein by reference.

TECHNICAL FIELD

The present disclosure relates to the technical field of metal melt purification, and in particular to a device and method for preparing a low-impurity regenerated brass alloy through step-by-step insertion of an electrode.

BACKGROUND

Copper and alloy materials thereof are widely used in electrical, automotive, construction, and national defense industries, and are second only to aluminum in terms of a proportion in the consumption of non-ferrous metal materials in China. Copper and alloys thereof are key basic materials for the vigorous development of engineering, and are also important industrial materials in fields such as industrial equipment, electronic information, and electrical appliances. In China, primary copper ore resources are seriously insufficient and highly dependent on imports.

Compared with the smelting of copper concentrates, the production of 1 ton of regenerated brass products can reduce a carbon dioxide emission by about 55,000 tons; and the recycling of 1 ton of brasses can reduce the consumption of 4.5 tons of copper concentrates. The development and utilization of secondary resources can maximize the recycling of resources, bring considerable economic benefits to enterprises, and become an important way to allow sustainable development. However, brass raw materials to be regenerated are widely available and in various types and forms, and include many pollutants such as inclusions and attachments. If these raw materials are directly smelted, the resulting melts have characteristics such as a wide variety of impurity elements and high contents of these impurity elements, which affect the processing properties and physical and mechanical properties of copper to varying degrees. Therefore, in order to improve the quality of regenerated brass alloy, it is very important to remove impurity elements in the melt during smelting of the brass alloy to be regenerated. This helps to maximize a regeneration potential of a brass alloy to be regenerated and improve the purity and comprehensive properties of an alloy material product.

An electrolytic tank for producing copper powder with a waste copper material is provided in the prior art, including: a tank body, and a toroidal anode jacket and a cathode copper column located in the tank body, where the toroidal anode jacket is sleeved outside the cathode copper column; an electrolyte is filled in the tank body; and the toroidal anode jacket is configured to hold a copper material to be electrolyzed. This electrolytic tank can electrolyze a low-grade waste copper material into an electrolytic copper powder product meeting national standards. However, this electrolytic tank needs to meet high requirements and involves cumbersome operations, the electrolyte needs to be changed regularly, and a direct-current (DC) electric field has a high energy consumption and thus leads to a high production cost, which is not in line with the requirements of the current industrial green development plan.

A method for comprehensive recovery of valuable metals from a copper-based solid waste is also provided in the prior art, including the following steps: the copper-based solid waste, a coal, and a flux are thoroughly mixed and subjected to reducing smelting to obtain crude copper, a reducing slag, and a smoke dust; the crude copper is refined at an anode with a fuel rate of 5% to 15% and a slag-forming rate of 3% to 30% to obtain a copper anode plate, a refining slag, and a smoke dust; and the refining slag is subjected to acid-leaching to obtain electrolytic copper and a leaching residue. This method can not only efficiently separate copper from a copper-based solid waste, but can also treat heavy metal-containing solid waste such as waste copper, zinc hypoxide-containing smoke dust, and tin-containing residue, which allows the cascading comprehensive and efficient recovery of copper, zinc, lead, and tin in the whole process. However, this method involves a long regeneration process and complicated parameter variables, and cannot allow the purification and impurity removal of an alloy melt in a short process.

A method for removing iron from waste copper in the prior art mainly includes raw material pretreatment, magnetic separation, smelting, and casting. In this method, a waste copper raw material is first pretreated to remove iron products that are easily separated, and a resulting copper raw material is crushed by a metal crushing machine and then subjected to magnetic separation to further physically separate iron products; and a resulting crushed material is completely melted in an induction furnace, copper foil-wrapped copper chloride or cuprous chloride (refining agent) is added, and a resulting melt is heated to 950° C. to 1,500° C., kept at this temperature for 15 to 60 min under stirring, and cast into an ingot. The iron content in the ingot copper alloy is reduced to 0.1% or lower, and the iron content in a treated copper alloy is also significant decreased, indicating the successful purification of a regenerated copper melt. However, the introduction of impurity reduction through slag formation by the refining agent will inevitably lead to the introduction of new impurity elements, which will affect the subsequent alloy processing properties. The impurity reduction through slag formation with the refining agent will also cause the oxidation of brass matrix metals Cu and Zn and the loss of the reduction medium to some degree, resulting in a loss for the purification system.

In view of the shortcomings of the processes and technologies for producing regenerated brass alloys in the prior art, it is urgent to develop a method and device for preparing a low-impurity regenerated brass alloy in actual industrial production with a short process, low cost, low energy consumption, and low carbon emission to cope with the shortcomings in the prior art, thereby solving or alleviating the above problems.

SUMMARY

The technical problem to be solved by the present disclosure is to provide a device and method for preparing a low-impurity regenerated brass alloy through step-by-step insertion of an electrode. On the one hand, the present disclosure can solve the problem that the impurity removal through slag formation with a refining agent may cause the introduction of new impurities. On the other hand, if an electrode is directly inserted at a bottom, due to a large-volume melt size effect, an electromigration-based impurity removal effect is not obvious (elements migrate in a horizontal direction), and due to a density difference between an impurity element and a matrix, impurity elements in a melt migrate in a vertical direction under driving by a current density gradient. Therefore, in the device and method for preparing a low-impurity regenerated brass alloy through step-by-step insertion of an electrode, a position of an electrode in a melt during application of a pulse current can be changed, such that an increased current density gradient can be formed in the melt to promote the migration of impurity elements in the vertical direction, thereby allowing a purification effect of a large-volume brass melt to be regenerated. In the present disclosure, an electric field-assisted melt purification technology is combined with a regenerated brass alloy production system to prepare a low-impurity brass alloy.

The device includes a melt heating apparatus, an electrode displacement apparatus, and a pulse current generation apparatus, where the melt heating apparatus includes a heating source, a metal melt, and a melting pool; the electrode displacement apparatus includes a graphite electrode plate, a connector, a connecting rod, a fixation knob, a telescopic rod, a hydraulic unit, a motor, a sliding plate, a parallel metal sliding plate base, a fixation base, and a fixation nut, and is configured to control a position of the graphite electrode plate to allow the step-by-step insertion of the graphite electrode plate in the metal melt; the pulse current generation apparatus and a metal wire are configured to provide a pulse current;

the graphite electrode plate has one end inserted into the metal melt and the other end connected to the connector; the connector is connected to the connecting rod through the fixation nut; the connecting rod penetrates through the telescopic rod and is configured to control the graphite electrode plate to move back and forth through the fixation knob; the telescopic rod is configured to control the graphite electrode plate to move up and down through the hydraulic unit and the motor; the hydraulic unit and the motor are arranged on the sliding plate, and the sliding plate is connected to the parallel metal sliding plate base; the sliding plate and the parallel metal sliding plate base are configured to control the graphite electrode plate to move left and right; the parallel metal sliding plate base is arranged on the fixation base; the connector is connected to the pulse current generation apparatus through a metal wire;

the telescopic rod and the hydraulic unit form an automatic electrode lifting apparatus;

a strong magnetic apparatus is provided inside the sliding plate and is configured to fix the sliding plate to the parallel metal sliding plate base; and a method for using the device includes the following steps:

S1: placing a high-impurity brass raw material to be regenerated in the melting pool, and starting the melt heating apparatus, such that the high-impurity brass raw material is melted, stirred, and incubated;

S2: connecting the graphite electrode plate to the pulse current generation apparatus through a metal wire, starting the automatic electrode lifting apparatus to insert the graphite electrode plate into a resulting metal melt, and starting the pulse current generation apparatus to allow a pulse current treatment on the metal melt for a fixed time;

S3: controlling the automatic electrode lifting apparatus to descend to increase an insertion depth of the graphite electrode plate in the metal melt, and conducting a pulse current treatment, where a descending distance is consistent with a distance of the graphite electrode plate from a surface of the metal melt in S2, and a time of the pulse current treatment is the same as a time of the pulse current treatment in S2;

S4: repeating S3 until a bottom of the graphite electrode plate is close to a bottom of the melting pool, where due to a density difference between an impurity element and a matrix, impurity elements in the metal melt migrate in a vertical direction under driving by a current density gradient; and thus, in the device, a position of the graphite electrode plate in the metal melt during application of a pulse current is changed, such that an increased current density gradient can be formed in the metal melt to promote the migration of impurity elements in the vertical direction, thereby allowing a purification effect of a large-volume brass melt to be regenerated to obtain a low-impurity regenerated brass alloy;

S5: after a final pulse current treatment is completed, collecting and testing a sample, adjusting a temperature of the metal melt, and discharging to obtain the low-impurity regenerated brass alloy.

In S1, the metal melt is heated at 1,000° C. to 1,200° C.; the metal melt is stirred for 1 min to 60 min; and the metal melt is incubated at 900° C. to 1,200° C. for 1 min to 500 min.

In S2, the pulse current treatment is conducted with a current of 1 A to 5,000 A, an electrical pulse frequency of 1 Hz to 120 kHz, a pulse width of 1 µs to 1,000 ms, and a voltage of 1 V to 36 V, an insertion depth of the graphite electrode plate in the metal melt each time is 20% to 25% of a total height of the metal melt, and each pulse current is applied for 1 min to 60 min; and finally, a distance between the bottom of the graphite electrode plate and the bottom of the melting pool is 2 cm to 30 cm.

In S5, the temperature of the metal melt is adjusted to 850° C. to 1,100° C., and then the metal melt is discharged.

Various impurity elements in the high-impurity brass raw material to be regenerated include one or more selected from the group consisting of the following elements: Pb: 0.001 wt. % to 7.0 wt. %, Bi: 0.001 wt. % to 6.0 wt. %, Fe: 0.1 wt. % to 2.5 wt. %, Al: 0.01 wt. % to 2.45 wt. %, Si: 0.01 wt. % to 2.5 wt. %, and Sn: 0.1 wt. % to 2.0 wt. %.

Removal rates of various impurity elements in the low-impurity regenerated brass alloy are as follows: Pb: 60% to 90%, Bi: 50% to 90%, Fe: 55% to 85%, Al: 50% to 82%, Si: 50% to 80%, and Sn: 50% to 70%.

Generally, the heating source in the melt heating apparatus includes, but is not limited to, a line frequency induction furnace.

The above technical solutions of the present disclosure have the following beneficial effects:

In the above solution, the combination of the melt heating apparatus, the electrode displacement apparatus, and the pulse current generation apparatus can allow the integrated impurity reduction and alloying preparation for brass to be regenerated. The present disclosure successfully combines an electric field-assisted melt purification technology with a regenerated brass alloy preparation technology, and enables large-scale continuous production. The device and method for preparing a low-impurity regenerated brass alloy involve a short production process, simple operations, low energy consumption, and high impurity removal efficiency, meet the requirements of the current industrial green development plan, and are suitable for regeneration and large-scale continuous production of various non-ferrous metal alloys. In the present disclosure, impurity reduction is conducted for a large-volume brass melt with various impurity elements to be regenerated through the electrode displacement apparatus; and an electric field-assisted melt purification technology is combined with a regenerated brass alloy production system to prepare a low-impurity brass alloy. On the one hand, the present disclosure solves the problem that the impurity removal through slag formation with a refining agent may cause the introduction of new impurities; and on the other hand, the present disclosure allows an impurity reduction effect for a large-volume brass melt through the electrode displacement apparatus.

BRIEF DESCRIPTION OF THE DRAWINGS

FIG. 2A is for a brass product prepared without a pulse current treatment and FIG. 2B is for a brass product prepared with a pulse current treatment.

Figure 1:
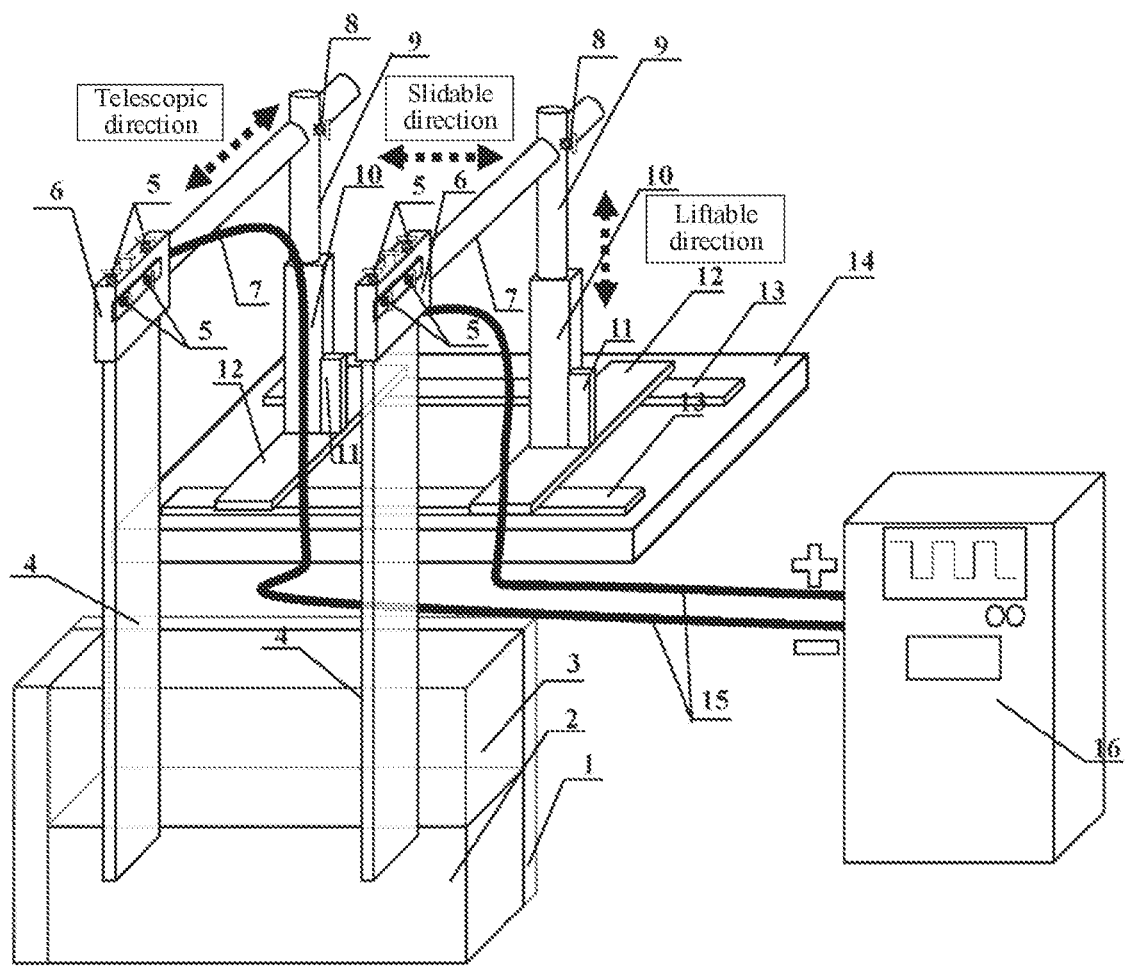
FIG. 1 is a schematic structural diagram of the device for preparing a low-impurity regenerated brass alloy through step-by-step insertion of an electrode in the present disclosure.

Reference numerals: 1: heating source; 2: metal melt; 3: melting pool; 4: graphite electrode plate; 5: fixation nut; 6: connector; 7: connecting rod; 8: fixation knob; 9: telescopic rod; 10: hydraulic unit; 11: motor; 12: sliding plate; 13: parallel metal sliding plate base; 14: fixation base; 15: metal wire; and 16: pulse current generation apparatus.

DETAILED DESCRIPTION OF THE EMBODIMENTS

To make the to-be-solved technical problems, technical solutions, and advantages of the present disclosure clear, the present disclosure will be described in detail below with reference to the accompanying drawings and specific embodiments.

The present disclosure provides a device and method for preparing a low-impurity regenerated brass alloy through step-by-step insertion of an electrode.

As shown in FIG. 1, the device includes a melt heating apparatus, an electrode displacement apparatus, and pulse current generation apparatus 16, where the melt heating apparatus includes heating source 1, metal melt 2, and melting pool 3; the electrode displacement apparatus includes graphite electrode plate 4, connector 6, connecting rod 7, fixation knob 8, telescopic rod 9, hydraulic unit 10, motor 11, sliding plate 12, parallel metal sliding plate base 13, fixation base 14, and fixation nut 5;

the graphite electrode plate 4 has one end inserted into the metal melt 2 and the other end connected to the connector 6; the connector 6 is connected to the connecting rod 7 through the fixation nut 5; the connecting rod 7 penetrates through the telescopic rod 9 and is configured to control the graphite electrode plate 4 to move back and forth through the fixation knob 8; the telescopic rod 9 is configured to control the graphite electrode plate 4 to move up and down through the hydraulic unit 10 and the motor 11; the hydraulic unit 10 and the motor 11 are arranged on the sliding plate 12, and the sliding plate 12 is connected to the parallel metal sliding plate base 13; the sliding plate 12 and the parallel metal sliding plate base 13 are configured to control the graphite electrode plate 4 to move left and right; the parallel metal sliding plate base 13 is arranged on the fixation base 14; the connector 6 is connected to the pulse current generation apparatus 16 through metal wire 15;

the telescopic rod 9 and the hydraulic unit 10 form an automatic electrode lifting apparatus; and a strong magnetic apparatus is provided inside the sliding plate 12 and is configured to fix the sliding plate 12 to the parallel metal sliding plate base 13.

Generally, specific process parameters of the device are as follows: mass of a high-impurity brass melt to be treated: 100 kg to 5,000 kg, and graphite electrode: rectangular electrode (length: 5 cm to 200 cm, width: 1 cm to 20 cm, and height: 80 cm to 300 cm).

A method for using the device includes the following steps:

S1: a high-impurity brass raw material to be regenerated is placed in the melting pool, and the melt heating apparatus is started, such that the high-impurity brass raw material is melted, stirred, and incubated;

S2: the graphite electrode plate is connected to the pulse current generation apparatus through a metal wire, the automatic electrode lifting apparatus is started to insert the graphite electrode plate into a resulting metal melt, and the pulse current generation apparatus is started to allow a pulse current treatment on the metal melt for a fixed time;

S3: the automatic electrode lifting apparatus is controlled to descend to increase an insertion depth of the graphite electrode plate in the metal melt, and a pulse current treatment is conducted, where a descending distance is consistent with a distance of the graphite electrode plate from a surface of the metal melt in S2, and a time of the pulse current treatment is the same as a time of the pulse current treatment in S2;

S4: S3 is repeated until a bottom of the graphite electrode plate is close to a bottom of the melting pool (in general, finally, a distance between the bottom of the graphite electrode plate and the bottom of the melting pool is 2 cm to 30 cm); and S5: after a final pulse current treatment is completed, a sample is collected and tested, a temperature of the metal melt is adjusted (in general, the temperature is adjusted to 850° C. to 1,100° C.), and then the metal melt is discharged to obtain the low-impurity regenerated brass alloy.

In the present disclosure, a pulse current is applied to a high-impurity brass melt through step-by-step insertion of an electrode, and the automatic electrode lifting apparatus controls the electrode to gradually descend in the melt from top to bottom over time; and the multiple changes of a position of the electrode lead to a more dense distribution of current lines in the melt and a strong electric driving force, which can promote the directed migration of impurity elements in the melt. A mechanism of the device is as follows. Based on a density difference between an impurity element (Cu: 8.96 g/cm$^{-3}$, and Zn: 7.14 g/cm$^{-3}$) and a matrix, the device can change a position of an electrode step by step to create a powerful current density gradient, which can promote the vertical migration of the impurity elements in the melt. For example, when the electrode descends step by step, the impurity elements Pb and Bi with large densities (Pb: 11.343 g/cm$^{-3}$, and Bi: 9.8 g/cm$^{-3}$) eventually accumulate at the bottom of the melting pool due to a strong electric driving force, and then are removed at a regular furnace shutdown and furnace wall beating stage; and the impurity elements Si and Fe (Si: 2.33 g/cm$^{-3}$, and Fe: 7.86 g/cm$^{-3}$) each with a density lower than a density of a brass matrix element move in the melt and gather on a surface of the melt, and then removed through slagging-off. Finally, contents of various impurity elements in the melt can be reduced to improve an impurity of a regenerated brass alloy to obtain a low-impurity regenerated brass alloy.

The present disclosure is described below with reference to specific examples.

EXAMPLE 1

This example provides a device and method for preparing a low-impurity regenerated brass alloy through step-by-step insertion of an electrode. The device includes a melt heating apparatus, an electrode displacement apparatus, and a pulse current generation apparatus. The melt heating apparatus includes heating source 1, metal melt 2, and melting pool 3, and is configured to heat the metal melt; the electrode displacement apparatus includes graphite electrode plate 4, fixation nut 5, connector 6, connecting rod 7, fixation knob 8, telescopic rod 9, hydraulic unit 10, motor 11, sliding plate 12, parallel metal sliding plate base 13, and fixation base 14, and is configured to control a position of the graphite electrode plate to allow the step-by-step insertion of the graphite electrode plate in the metal melt; a metal wire 15 and the pulse current generation apparatus 16 are configured to provide a pulse current.

In this example, a high-impurity Bi brass raw material (Bi: 5.983 wt. %) was used to prepare a low-impurity regenerated brass alloy, specifically including the following steps:

Step 1: About 100 kg of the high-impurity Bi brass raw material was weighed and placed in the melting pool, heated by the heating source to 1,100° C., stirred for 1 min, and incubated at 1,000° C. for 10 min, such that the raw material was completely melted to obtain a homogeneous brass melt to be regenerated.

Step 2: A columnar graphite electrode plate (length×width×height: 5 cm×1 cm×100 cm) was connected to the pulse current generation apparatus through a metal wire; the automatic electrode lifting apparatus was started, such that the electrode was inserted into the melt at an insertion depth of 2 cm; and the pulse current generation apparatus was started to allow a pulse current treatment for 10 min, where specific parameters of the pulse current generation apparatus were as follows: voltage: 17 V, pulse current: 150 A, frequency: 2,000 Hz, and pulse width: 500 μs.

Step 3: The automatic electrode lifting apparatus was controlled to make the electrode inserted into the melt descend, and then a pulse current treatment was conducted, where a descending distance, a time of the pulse current treatment, and parameters of the pulse current generation apparatus were the same as that in step 2.

Step 4: Step 3 was repeated until a bottom of the electrode was close to a bottom of a melting pool.

Figure 2A:
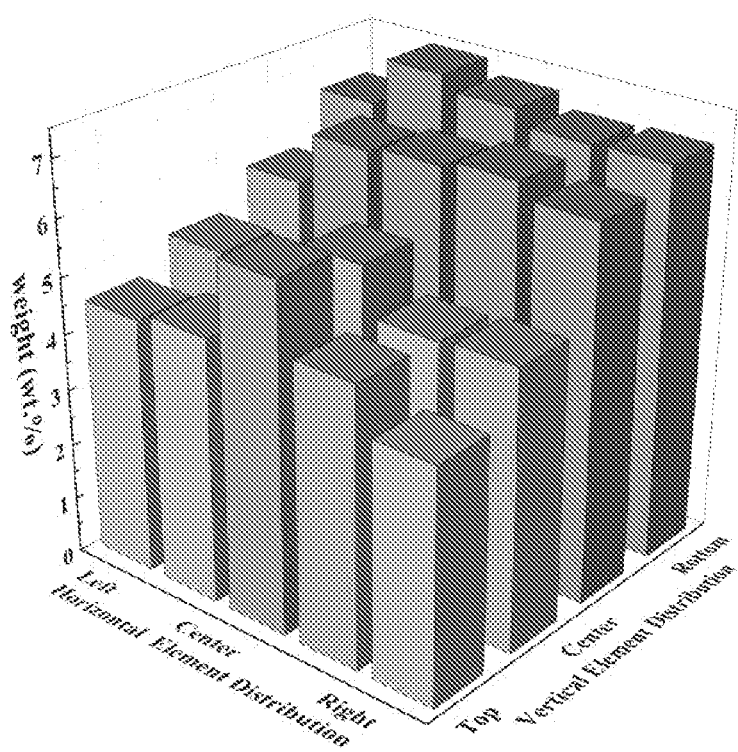
FIGS. 2A-2B show the comparison of Bi element distributions in solidified brass products prepared with a pulse current treatment and without a pulse current treatment in the embodiments of the present disclosure, where
Figure 2B:
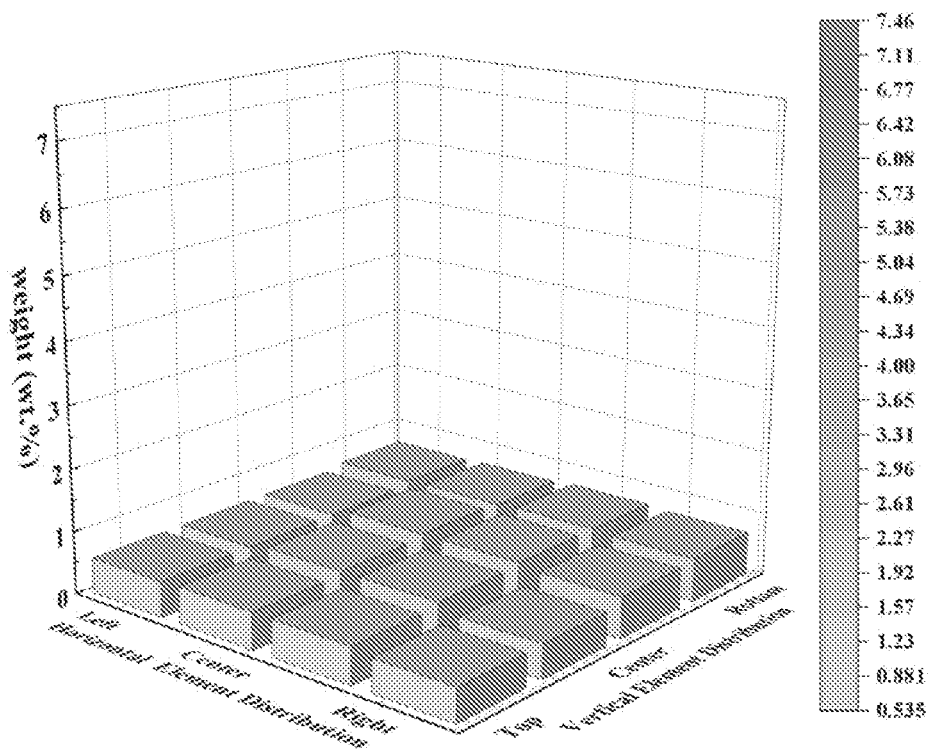

Step 5: After a final pulse current treatment was completed, a resulting melt was incubated, subjected to slag removal, discharged, and casted into an ingot to obtain the low-impurity regenerated brass alloy. A copper alloy between electrodes obtained after the pulse treatment was subjected to composition analysis by an X-ray fluorescence (XRF) analyzer. Analysis results showed that, after the pulse treatment, an average mass concentration of the impurity element Bi was 0.633 wt. % and a corresponding removal rate reached 89.42%. It can be seen that the pulse current treatment conducted through step-by-step insertion of an electrode can effectively reduce the contents of various impurity elements in waste copper in large areas. Comparison results are shown in FIGS. 2A-2B.

EXAMPLE 2

The present disclosure is suitable for purification of a brass alloy melt with various impurity elements to prepare a low-impurity regenerated brass alloy. In this example, a brass alloy with various impurity elements to be regenerated was adopted as a raw material.

The high-impurity brass raw material used in this example included the following elements: Pb: 6.83 wt. %, Bi: 3.482 wt. %, Fe: 2.51 wt. %, Al: 1.56 wt. %, Si: 0.1 wt. %, and Sn: 0.2 wt. %. The preparation of the low-impurity regenerated brass alloy specifically included the following steps:

Step 1: About 500 kg of the high-impurity brass raw material was weighed and placed in the melting pool, heated by the heating source to 1,100° C., stirred for 5 min, and incubated at 900° C. for 20 min, such that the raw material was completely melted to obtain a homogeneous brass melt to be regenerated.

Step 2: A rectangular graphite electrode (length×width×height: 10 cm×5 cm×100 cm) was connected to the pulse current generation apparatus through a metal wire; the automatic electrode lifting apparatus was started, such that the electrode was inserted into the melt at an insertion depth of 10 cm; and the pulse current generation apparatus was started to allow a pulse current treatment for 15 min, where specific parameters of the pulse current generation apparatus were as follows: voltage: 24 V, pulse current: 1,500 A, frequency: 10,000 Hz, and pulse width: 100 μs.

Step 3: The automatic electrode lifting apparatus was controlled to make the electrode inserted into the melt descend, and then a pulse current treatment was conducted, where a descending distance, a time of the pulse current treatment, and parameters of the pulse current generation apparatus were the same as that in step 2.

Step 4: Step 3 was repeated until a bottom of the electrode was close to a bottom of a melting pool.

Step 5: After a final pulse current treatment was completed, a resulting melt was incubated, subjected to slag removal, discharged, and casted into an ingot to obtain the low-impurity regenerated brass alloy. A copper alloy between electrodes obtained after the pulse treatment was subjected to composition analysis by an XRF analyzer. Analysis results showed that, after the pulse treatment, mass concentrations of the impurity elements Pb, Bi, Fe, Al, Si, and Sn were 2.675 wt. %, 0.514 wt. %, 0.612 wt. %, 0.2652 wt. %, 0.0196 wt. %, and 0.0585 wt. %, respectively, and corresponding removal rates reached 60.84%, 85.24%, 75.6%, 83%, 80.45%, and 70.74%, respectively. It can be seen that the pulse current treatment conducted through step-by-step insertion of an electrode can effectively reduce the contents of various impurity elements in waste copper in large areas.

EXAMPLE 3

The present disclosure is suitable for purification of a brass alloy melt with various impurity elements to prepare a low-impurity regenerated brass alloy. In this example, a brass alloy with various impurity elements to be regenerated was adopted as a raw material.

The high-impurity brass raw material used in this example included the following elements: Pb: 5.3 wt. %, Bi: 3.269 wt. %, Fe: 1.0 wt. %, Al: 0.01 wt. %, Si: 0.374 wt. %, and Sn: 1.2 wt. %. The preparation of the low-impurity regenerated brass alloy specifically included the following steps:

Step 1: About 500 kg of the high-impurity brass raw material was weighed and placed in the melting pool, heated by the heating source to 1,050° C., stirred for 5 min, and incubated at 900° C. for 15 min, such that the raw material was completely melted to obtain a homogeneous brass melt to be regenerated.

Step 2: A rectangular graphite electrode (length×width×height: 10 cm×5 cm×100 cm) was connected to the pulse current generation apparatus through a metal wire; the automatic electrode lifting apparatus was started, such that the electrode was inserted into the melt at an insertion depth of 1 cm; and the pulse current generation apparatus was started to allow a pulse current treatment for 5 min, where specific parameters of the pulse current generation apparatus were as follows: voltage: 12 V, pulse current: 1,500 A, frequency: 1 Hz, and pulse width: 1,000 ms.

Step 3: The automatic electrode lifting apparatus was controlled to make the electrode inserted into the melt descend, and then a pulse current treatment was conducted, where a descending distance, a time of the pulse current treatment, and parameters of the pulse current generation apparatus were the same as that in step 2.

Step 4: Step 3 was repeated until a bottom of the electrode was close to a bottom of a melting pool.

Step 5: After a final pulse current treatment was completed, a resulting melt was incubated, subjected to slag removal, discharged, and casted into an ingot to obtain the low-impurity regenerated brass alloy. A copper alloy between electrodes obtained after the pulse treatment was subjected to composition analysis by an XRF analyzer. Analysis results showed that, after the pulse treatment, mass concentrations of the impurity elements Pb, Bi, Fe, Al, Si, and Sn were 2.125 wt. %, 1.308 wt. %, 0.45 wt. %, 0.005 wt. %, 0.187 wt. %, and 0.6 wt. %, respectively, and corresponding removal rates reached 59.89%, 60%, 55%, 52.3%, 50%, and 50%, respectively. It can be seen that the pulse current treatment conducted through step-by-step insertion of an electrode can effectively reduce the contents of various impurity elements in waste copper in large areas.

EXAMPLE 4

The present disclosure is suitable for purification of a brass alloy melt with various impurity elements to prepare a low-impurity regenerated brass alloy. In this example, a brass alloy with various impurity elements to be regenerated was adopted as a raw material.

The high-impurity brass raw material used in this example included the following elements: Pb: 3.93 wt. %, Bi: 0.001 wt. %, Fe: 0.1 wt. %, Al: 2.45 wt. %, Si: 2.578 wt. %, and Sn: 0.3 wt. %. The preparation of the low-impurity regenerated brass alloy specifically included the following steps:

Step 1: About 1,000 kg of the high-impurity brass raw material was weighed and placed in a melting pool of a line frequency induction furnace, the heating apparatus was started to heat the line frequency induction furnace to 1,100° C., and the raw material was stirred for 10 min and incubated at 980° C. for 20 min, such that the raw material was completely melted to obtain a homogeneous brass melt to be regenerated.

Step 2: A rectangular shape and graphite electrode (length×width×height: 70 cm×15 cm×200 cm) was connected to the pulse current generation apparatus through a metal wire; the automatic electrode lifting apparatus was started, such that the electrode was inserted into the melt at an insertion depth of 10 cm; and the pulse current generation apparatus was started to allow a pulse current treatment for 20 min, where specific parameters of the pulse current generation apparatus were as follows: voltage: 36 V, pulse current: 2,000 A, frequency: 10,000 Hz, and pulse width: 100 µs.

Step 3: The automatic electrode lifting apparatus was controlled to make the electrode inserted into the melt descend, and then a pulse current treatment was conducted, where a descending distance, a time of the pulse current treatment, and parameters of the pulse current generation apparatus were the same as that in step 2.

Step 4: Step 3 was repeated until a bottom of the electrode was close to a bottom of a melting pool.

Step 5: After a final pulse current treatment was completed, a resulting melt was incubated, subjected to slag removal, discharged, and casted into an ingot to obtain the low-impurity regenerated brass alloy. A copper alloy between electrodes obtained after the pulse treatment was subjected to composition analysis by an XRF analyzer. Analysis results showed that, after the pulse treatment, mass concentrations of the impurity elements Pb, Bi, Fe, Al, Si, and Sn were 0.573 wt. %, 0.00013 wt. %, 0.0146 wt. %, 0.473 wt. %, 0.516 wt. %, and 0.0861 wt. %, respectively, and corresponding removal rates reached 85.43%, 86.82%, 85.4%, 80.71%, 80%, and 71.3%, respectively. It can be seen that the pulse current treatment conducted through step-by-step insertion of an electrode can effectively reduce the contents of various impurity elements in waste copper in large areas.

EXAMPLE 5

The present disclosure is suitable for purification of a brass alloy melt with various impurity elements to prepare a low-impurity regenerated brass alloy. In this example, a brass alloy with various impurity elements to be regenerated was adopted as a raw material.

The high-impurity brass raw material used in this example included the following elements: Pb: 0.001 wt. %, Bi: 5.471 wt. %, Fe: 1.5 wt. %, Al: 0.3 wt. %, Si: 2.478 wt. %, and Sn: 0.14 wt. %. The preparation of the low-impurity regenerated brass alloy specifically included the following steps:

Step 1: About 2,000 kg of the high-impurity brass raw material was weighed and placed in a melting pool of a line frequency induction furnace, the heating apparatus was started to heat the line frequency induction furnace to 1,100° C., and the raw material was stirred for 15 min and incubated at 1,000° C. for 30 min, such that the raw material was completely melted to obtain a homogeneous brass melt to be regenerated.

Step 2: A rectangular shape and graphite electrode (length×width×height: 70 cm×20 cm×250 cm) was connected to the pulse current generation apparatus through a metal wire; the automatic electrode lifting apparatus was started, such that the electrode was inserted into the melt at an insertion depth of 10 cm; and the pulse current generation apparatus was started to allow a pulse current treatment for 10 min, where specific parameters of the pulse current generation apparatus were as follows: voltage: 36 V, pulse current: 2,500 A, frequency: 20,000 Hz, and pulse width: 50 µs.

Step 3: The automatic electrode lifting apparatus was controlled to make the electrode inserted into the melt descend, and then a pulse current treatment was conducted, where a descending distance, a time of the pulse current treatment, and parameters of the pulse current generation apparatus were the same as that in step 2.

Step 4: Step 3 was repeated until a bottom of the electrode was close to a bottom of a melting pool.

Step 5: After a final pulse current treatment was completed, a resulting melt was incubated, subjected to slag removal, discharged, and casted into an ingot to obtain the low-impurity regenerated brass alloy. A copper alloy between electrodes obtained after the pulse treatment was subjected to composition analysis by an XRF analyzer. Analysis results showed that, after the pulse treatment, mass concentrations of the impurity elements Pb, Bi, Fe, Al, Si, and Sn were 0.00013 wt. %, 2.210 wt. %, 0.366 wt. %, 0.063 wt. %, 0.6442 wt. %, and 0.0308 wt. %, respectively, and corresponding removal rates reached 87%, 59.6%, 75.6%, 79%, 74%, and 78%, respectively. It can be seen that the pulse current treatment conducted through step-by-step insertion of an electrode can effectively reduce the contents of various impurity elements in waste copper in large areas.

EXAMPLE 6

The present disclosure is suitable for purification of a brass alloy melt with various impurity elements to prepare a low-impurity regenerated brass alloy. In this example, a brass alloy with various impurity elements to be regenerated was adopted as a raw material.

The high-impurity brass raw material used in this example included the following elements: Pb: 4.587 wt. %, Bi: 3.412 wt. %, Fe: 0.745 wt. %, Al: 0.01 wt. %, Si: 0.01 wt. %, and Sn: 2.00 wt. %. The preparation of the low-impurity regenerated brass alloy specifically included the following steps:

Step 1: About 2,500 kg of the high-impurity brass raw material was weighed and placed in a melting pool of a line frequency induction furnace, the heating apparatus was started to heat the line frequency induction furnace to 1,100° C., and the raw material was stirred for 20 min and incubated at 1,000° C. for 40 min, such that the raw material was completely melted to obtain a homogeneous brass melt to be regenerated.

Step 2: A rectangular shape and graphite electrode (length×width×height: 200 cm×10 cm×300 cm) was connected to the pulse current generation apparatus through a metal wire; the automatic electrode lifting apparatus was started, such that the electrode was inserted into the melt at an insertion depth of 20 cm; and the pulse current generation apparatus was started to allow a pulse current treatment for 20 min, where specific parameters of the pulse current generation apparatus were as follows: voltage: 36 V, pulse current: 3,000 A, frequency: 100,000 Hz, and pulse width: 1 μs.

Step 3: The automatic electrode lifting apparatus was controlled to make the electrode inserted into the melt descend, and then a pulse current treatment was conducted, where a descending distance, a time of the pulse current treatment, and parameters of the pulse current generation apparatus were the same as that in step 2.

Step 4: Step 3 was repeated until a bottom of the electrode was close to a bottom of a melting pool.

Step 5: After a final pulse current treatment was completed, a resulting melt was incubated, subjected to slag removal, discharged, and casted into an ingot to obtain the low-impurity regenerated brass alloy. A copper alloy between electrodes obtained after the pulse treatment was subjected to composition analysis by an XRF analyzer. Analysis results showed that, after the pulse treatment, mass concentrations of the impurity elements Pb, Bi, Fe, Al, Si, and Sn were 1.335 wt. %, 0.839 wt. %, 0.193 wt. %, 0.002 wt. %, 0.002 wt. %, and 0.896 wt. %, respectively, and corresponding removal rates reached 70.89%, 75.41%, 74.1%, 80.71%, 80%, and 55.2%, respectively. It can be seen that the pulse current treatment conducted through step-by-step insertion of an electrode can effectively reduce the contents of various impurity elements in waste copper in large areas.

EXAMPLE 7

The present disclosure is suitable for purification of a brass alloy melt with various impurity elements to prepare a low-impurity regenerated brass alloy. In this example, a brass alloy with various impurity elements to be regenerated was adopted as a raw material.

The high-impurity brass raw material used in this example included the following elements: Pb: 7.0 wt. %, Bi: 5.947 wt. %, Fe: 0.15 wt. %, Al: 2.41 wt. %, Si: 0.374 wt. %, and Sn: 0.1 wt. %. The preparation of the low-impurity regenerated brass alloy specifically included the following steps:

Step 1: About 5,000 kg of the high-impurity brass raw material was weighed and placed in a melting pool of a line frequency induction furnace, the heating apparatus was started to heat the line frequency induction furnace to 1,200° C., and the raw material was stirred for 20 min and incubated at 1,000° C. for 60 min, such that the raw material was completely melted to obtain a homogeneous brass melt to be regenerated.

Step 2: A rectangular shape and graphite electrode (length×width×height: 200 cm×20 cm×300 cm) was connected to the pulse current generation apparatus through a metal wire; the automatic electrode lifting apparatus was started, such that the electrode was inserted into the melt at an insertion depth of 10 cm; and the pulse current generation apparatus was started to allow a pulse current treatment for 10 min, where specific parameters of the pulse current generation apparatus were as follows: voltage: 36 V, pulse current: 4,500 A, frequency: 120,000 Hz, and pulse width: 500 ms.

Step 3: The automatic electrode lifting apparatus was controlled to make the electrode inserted into the melt descend, and then a pulse current treatment was conducted, where a descending distance, a time of the pulse current treatment, and parameters of the pulse current generation apparatus were the same as that in step 2.

Step 4: Step 3 was repeated until a bottom of the electrode was close to a bottom of a melting pool.

Step 5: After a final pulse current treatment was completed, a resulting melt was incubated, subjected to slag removal, discharged, and casted into an ingot to obtain the low-impurity regenerated brass alloy. A copper alloy between electrodes obtained after the pulse treatment was subjected to composition analysis by an XRF analyzer. Analysis results showed that, after the pulse treatment, mass concentrations of the impurity elements Pb, Bi, Fe, Al, Si, and Sn were 2.625 wt. %, 2.289 wt. %, 0.0225 wt. %, 1.205 wt. %, 0.097 wt. %, and 0.03 wt. %, respectively, and corresponding removal rates reached 62.5%, 61.5%, 85%, 50%, 74%, and 70%, respectively. It can be seen that the pulse current treatment conducted through step-by-step insertion of an electrode can effectively reduce the contents of various impurity elements in waste copper in large areas.

The above are preferred implementations of the present disclosure. It should be noted that a person of ordinary skill in the art may further make several improvements and modifications without departing from the principle of the present disclosure, but such improvements and modifications should also be deemed as falling within the protection scope of the present disclosure.

What is claimed is:

1. A method for using a device for preparing regenerated brass alloy through a step-by-step insertion of an electrode, the device comprising a melt heating apparatus, an electrode displacement apparatus, and a pulse current generation apparatus, wherein the melt heating apparatus comprises a heating source, a metal melt, and a melting pool; the electrode displacement apparatus comprises a graphite electrode plate, a connector, a connecting rod, a fixation knob, a telescopic rod, a hydraulic unit, a motor, a sliding plate, a parallel metal sliding plate base, a fixation base, and a fixation nut;

the graphite electrode plate has one end inserted into the metal melt and the other end connected to the connector; the connector is connected to the connecting rod through the fixation nut; the connecting rod penetrates through the telescopic rod and is configured to control the graphite electrode plate to move back and forth through the fixation knob; the telescopic rod is configured to control the graphite electrode plate to move up and down through the hydraulic unit and the motor; the hydraulic unit and the motor are arranged on the sliding plate, and the sliding plate is connected to the parallel metal sliding plate base; the sliding plate and the parallel metal sliding plate base are configured to control the graphite electrode plate to move left and right; the parallel metal sliding plate base is arranged on the fixation base; the connector is connected to the pulse current generation apparatus through a metal wire, wherein the method comprises the following steps:

S1: placing a impurity containing brass raw material to be regenerated in the melting pool, and starting the melt heating apparatus, such that the impurity containing brass raw material is melted, stirred, and incubated;

S2: connecting the graphite electrode plate to the pulse current generation apparatus through a metal wire, starting an automatic electrode lifting apparatus to insert the graphite electrode plate into a resulting metal melt, and starting the pulse current generation apparatus to allow a pulse current treatment on the metal melt for a fixed time;

S3: controlling the automatic electrode lifting apparatus to descend to increase an insertion depth of the graphite electrode plate in the metal melt, and conducting a pulse current treatment, wherein a descending distance is consistent with a distance of the graphite electrode plate from a surface of the metal melt in S2, and a time of the pulse current treatment is the same as a time of the pulse current treatment in S2;

S4: repeating S3 until a bottom of the graphite electrode plate is close to a bottom of the melting pool;

S5: after a final pulse current treatment is completed, collecting and testing a sample of the metal melt, adjusting a temperature of the metal melt, and discharging the metal melt to obtain the regenerated brass alloy.

2. The method for using the device for preparing regenerated brass alloy through the step-by-step insertion of the electrode according to claim 1, wherein in S1, the metal melt is heated at 1,000° C. to 1,200° C.; the metal melt is stirred for 1 min to 60 min; and the metal melt is incubated at 900° C. to 1,200° C. for 1 min to 500 min.

3. The method for using the device for preparing regenerated brass alloy through the step-by-step insertion of the electrode according to claim 1, wherein in S2, the pulse current treatment is conducted with a current of 1 A to 5,000 A, an electrical pulse frequency of 1 Hz to 120 kHz, a pulse width of 1 μs to 1,000 ms, and a voltage of 1 V to 36 V, an insertion depth of the graphite electrode plate in the metal melt each time is 2% to 50% of a total height of the metal melt, and each pulse current is applied for 1 min to 60 min, wherein finally, a distance between the bottom of the graphite electrode plate and the bottom of the melting pool is 2 cm to 30 cm.

4. The method for using the device for preparing regenerated brass alloy through the step-by-step insertion of the electrode according to claim 1, wherein in S5, the temperature of the metal melt is adjusted to 850° C. to 1,100° C., and then the metal melt is discharged.

5. The method for using the device for preparing regenerated brass alloy through the step-by-step insertion of the electrode according to claim 4, wherein impurity elements in the impurity containing brass raw material to be regenerated comprise one or more selected from the group consisting of the following elements: Pb: 0.001 wt. % to 7.0 wt. %, Bi: 0.001 wt. % to 6.0 wt. %, Fe: 0.1 wt. % to 2.5 wt. %, Al: 0.01 wt. % to 2.45 wt. %, Si: 0.01 wt. % to 2.5 wt. %, and Sn: 0.1 wt. % to 2.0 wt. %.

\* \* \* \* \*